Figure 1:
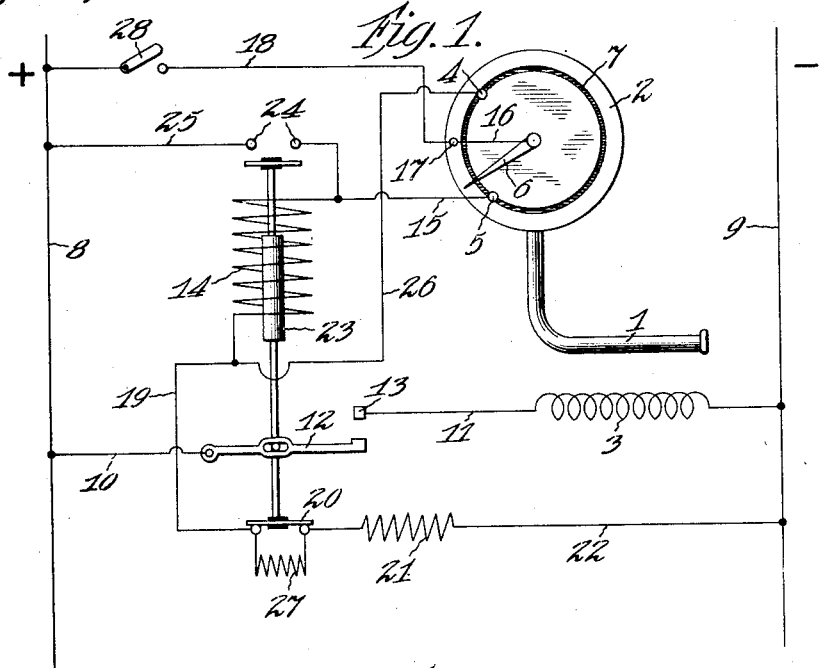

W. S. HADAWAY, Jr.
TEMPERATURE REGULATOR.
APPLICATION FILED AUG. 16, 1911.

1,093,126.

Patented Apr. 14, 1914.

Attest:

Inventor: William S. Hadaway, Jr.

by Edwin B. Nova, Jr.
Atty

UNITED STATES PATENT OFFICE.

WILLIAM S. HADAWAY, JR., OF NEW YORK, N. Y.

TEMPERATURE-REGULATOR.

1,093,126.

Specification of Letters Patent.

Patented Apr. 14, 1914.

Application filed August 16, 1911. Serial No. 644,466.

*To all whom it may concern:*

Be it known that I, WILLIAM S. HADAWAY, Jr., a citizen of the United States, residing at New York, in the county of New York and State of New York, have invented new and useful Improvements in Temperature-Regulators, of which the following is a full, clear, concise, and exact description, reference being had to the accompanying drawing, forming a part of this specification.

My invention relates to improvements in temperature regulators.

It has for its object to provide a sensitive, accurate and otherwise thoroughly reliable temperature regulator, particularly adapted to electrical heating systems, but which may be used in various other relations.

Other objects and advantages of my invention will hereinafter appear.

According to one form of my invention, I provide the regulator with a liquid-vapor thermometer. The liquid of the thermometer is subjected directly to the temperature to be controlled and vaporizes to create a pressure varying with the temperature. The liquid is preferably supplied in such quantity as to maintain its vapor saturated, thereby insuring a definite relation between the temperature and the resultant pressure variations. The varying pressure resulting from the varying temperature is utilized to operate a pressure gage or other suitable means for controlling such other instrumentalities as are required to provide for the desired regulation of the heat supplying means. Regulators of this type have proved far superior to those regulators employing metallic or liquid thermometers in which the bodily expansion of the metal or liquid is relied upon to indicate the temperature variations. Regulators employing a metallic body as the thermometric substance are undesirable, among other reasons, because the expansion thereof for a given temperature is dependent upon the size of the body and because the degree of expansion relative to a comparatively small temperature variation is slight. Accordingly, it is very difficult to calibrate such regulators, and further, the use of such a thermometric substance necessitates the use in conjunction therewith of very sensitive and finely adjusted mechanisms which are expensive, unreliable, and not durable.

Regulators employing an expansible liquid as the thermometric substance are open to the objections just mentioned, and further are very unreliable, due to the unavoidable loss of the liquid by leakage, burning, evaporation, etc., which materially disturbs the calibration of the regulator.

Regulators embodying my invention overcome all of the aforesaid difficulties for I have found that the pressure of the saturated vapor will always bear a definite relation to the temperature to be controlled irrespective of the volume of liquid employed and that large variations in pressure for relatively small variations in temperature may be readily obtained by selection of liquids. For example, if water be employed the pressure will vary with respect to the temperature in a ratio of 8 to 1 within certain limits. Other liquids will provide for pressure bearing different relations to the temperature between other limits. Thus by selection of liquids I am able to obtain various different pressure curves and can thus readily calibrate my regulator as desired.

In order to more fully and clearly disclose my invention I shall describe the embodiment thereof illustrated in the accompanying drawing, it being understood that my invention might be embodied in various other forms.

Figure 2:
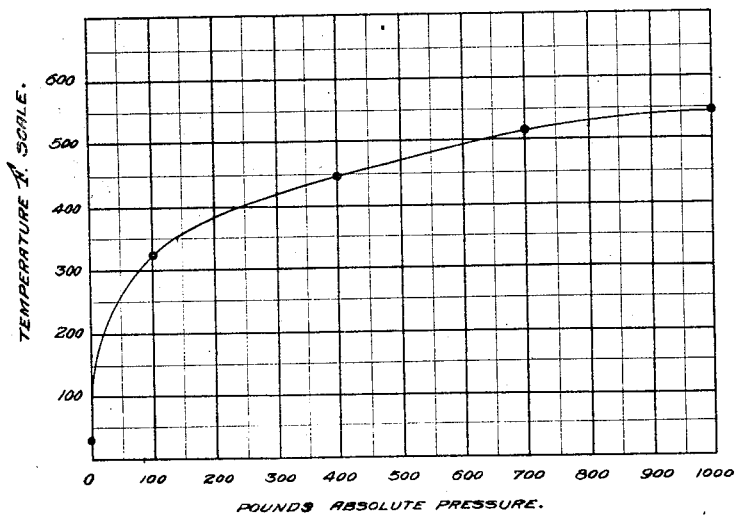

In the drawing, Figure 1 is a schematic and diagrammatic view of the regulator; Fig. 2 illustrates a pressure curve hereinafter described.

The regulator illustrated comprises a thermometer tube 1 to which is connected a pressure gage 2 which, through suitable means, serves to control a heater 3, illustrated as an electrical heating coil. The thermometer tube 1 is subjected to the temperature to be controlled and may be located at any desired point with respect to the heater 3. The pressure gage 2 is provided with electrical contacts which, upon predetermined variations in the temperature are actuated by the pressure developed in the thermometer tube 1 to cause the heating coil 3 to be cut in and out of circuit to maintain the temperature within certain limits.

The thermometer 1 is illustrated as comprising a piece of metallic tubing or pipe sealed at one end and connected at its other end to the pressure gage 2. Within the thermometer tube 1 is a thermometric liquid which, in practice, may comprise any one of a number of different liquids. The liquid is supplied in such a quantity as to insure saturation of its vapor. For the purpose of this disclosure it may be assumed that the thermometer tube contains water, in which event the water is converted into saturated steam which supplies pressure to the gage 2 when the regulator is in operation. As will be hereinafter more fully explained the pressure of the saturated steam within the thermometer tube varies with the temperature to be controlled in a definite relation thereto. Thus the operation of the pressure gage due to variations in pressure will indicate the variations in the temperature.

The pressure gage is illustrated as of a conventional type. It is provided with contacts 4, 5, and 6 of which the contact 6 constitutes the gage needle or pointer. The contact 6 engages the contact 4 when the pressure increases to a predetermined degree and engages contact 5 as the pressure decreases. Thus as the pressure increases and decreases to a different predetermined degree with the temperature the contact 6 will engage contact 4 upon a rise in temperature and engage contact 5 upon a drop in temperature. The contacts 4 and 5 may be adjusted to insure engagement of contacts 6 and 4 at any desired maximum pressure and temperature and engagement of contacts 6 and 5 at any desired minimum pressure and temperature. Thus the range of movement of the contact 6 between the contacts 4 and 5 determined the permissible range of pressure and temperature variation. When the contacts 6 and 4 engage, they effect a reduction of the heat supplied by the heater 3, whereas the contacts 6 and 5 upon engagement effect an increase in the heat supplied by the coil 3. By this means it is obvious that the temperature is maintained between predetermined limits.

The means for directly controlling the heater comprises a switch 12 for opening and closing the circuit of the heater coil 3. The switch 12 is provided with an operating magnet coil 14 which influences a core 23 and is under the control of the pressure gage. The magnet coil is energized upon engagement of contacts 5 and 6 of the pressure gage and is deënergized upon engagement of contacts 4 and 6 of the pressure gage. The switch 12 is provided with an auxiliary switch adapted to bridge contacts 24 to establish a maintaining circuit for the winding 14 when the switch 12 is closed. This maintaining circuit shunts the gage contacts 5 and 6 so that after the switch 12 has once been closed it will remain closed during the movement of the gage contact 6 from contact 5 to contact 4. Also the switch 12 is provided with an auxiliary contact 20 which controls the resistance 27 in circuit with the magnet coil 14, as will be hereinafter more fully set forth.

I shall now more fully describe the operation of the regulator, at the same time clearly and fully describing the circuit connections therefor. Power is supplied from lines 8 and 9 and a manually controlled switch 28 is provided for opening and closing the circuit of the magnet coil of switch 12 at will. Assuming now that gage contacts 5 and 6 are in engagement and the switch 28 closed, a circuit is completed from line 8 through switch 28 by conductor 18 to binding post 17, by conductor 16 through gage contacts 6 and 5, by conductor 15 through the magnet coil 14 of switch 12, by conductor 19 through auxiliary switch 20 and through a protective resistance 21 by conductor 22 to line 9. Magnet coil 14 thereupon responds, moving switch 12 into engagement with its coöperating contact 13. This completes a circuit from line 8 by conductor 10 through switch 12 by conductor 11 through the heating coil 3 to line 9. Thus current is supplied to the heating coil 3, and said coil supplies heat which acts upon the water in the thermometer tube 1 to vaporize the same and create a pressure which acts upon the gage 2. As the temperature increases the pressure increases and when the pressure and temperature attain values corresponding to the position of contact 5, the gage contact 6 is moved away from the contact 5 and toward the contact 4. This would deënergize the magnet coil 14 of switch 12 except for the maintaining circuit established by the bridging of contacts 24. This maintaining circuit extends from line 8 by conductor 25 through contacts 24 and the operating magnet coil 14 by conductor 19 through the resistance 27 and resistance 21 to line 9, as already described. Thus the switch 12 will remain closed and maintain the circuit of the heating coil 3 after the gage contact 6 disengages contact 5. When, however, the pressure and temperature have attained values corresponding with the position of gage contact 4 the gage contact 6 engages contact 4 and deënergizes the magnet coil of switch 12. The gage contacts 6 and 4 effect this deënergization by a short-circuit around the magnet coil 14 which extends from line 8 to gage contact 6, as already traced and thence to contact 4 by conductor 26 to conductor 19. Thus upon engagement of contacts 6 and 4 switch 12 opens and disconnects the heating coil 3 from circuit. This results in the cessation of the heat supply until the gage contact 6 returns to engagement with contact 5 which it will do as soon as the pressure and temperature have dropped to values corresponding with the position of contact 5. When contact 6 again engages contact 5 the cycle of operation above described is again repeated. It is thus apparent that repetition of this cycle of operation maintains the temperature to be controlled within certain limits corresponding to the positions of the gage contacts 4 and 5.

In Fig. 2 I have depicted by a curve the relation between the pressure and temperature variations where water is employed as the thermometric liquid. The pressure scale is indicated along the abscissæ while the temperature scale is indicated along the ordinates. From the curve shown it is evident that as the temperature increases the pressure increases in a far greater proportion. For instance, as the temperature increases from the point indicated above the intersection of the lines indicating 300° and 100 lbs. to the point above the line indicating 400° the pressure increases from 100 lbs. to 400 lbs. approximately; whereas between 400° and 500° the pressure increases 100 lbs. for an increase in temperature of approximately 25°. Thus it is seen that as the temperature increases above 300° the curve commences to flatten out; and whereas the pressure has heretofore risen very slowly it commences to rise very rapidly maintaining a substantially regular curve in which at the higher temperatures the relation of pressure to temperature is approximately 8 to 1. Consequently it is evident that as the temperature to be controlled rises one degree a variation of about eight pounds pressure is indicated upon the pressure gage. With such a wide range of movement of the pressure gage for a small variation in temperature it is possible to regulate the temperature within a variation of one degree so that a practically constant temperature may be maintained. As previously set forth, various other thermometric liquids may be obtained, thereby facilitating the desired calibration of the regulator. As has just been set forth, water provides for a large variation in pressure for a small variation in temperature at high temperatures. Other liquids, on the other hand, provide for relatively large variations in pressure for small variations in temperature at lower temperatures so that by selection of thermometric liquids the regulator may be adapted to maintain substantially constant temperature between any predetermined limits without sacrifice of the advantages above set forth.

What I claim as new and desire to secure by Letters Patent, is:

1. In a temperature regulator, the combination with a heater and a thermometer containing a liquid subjected to a temperature to be controlled and adapted to be partially vaporized by said temperature whereby a saturated vapor under pressure varying with said temperature is formed in the thermometer, of means automatically responsive to the variations in pressure of said saturated vapor for controlling said heater.

2. In a temperature regulator, the combination with an electric heater and a thermometer comprising a closed body partially filled with liquid, subjected to the temperature to be controlled and adapted to be partially vaporized by said temperature, of a control switch for governing the electric heater automatically responsive to the variations in pressure of said vapor.

3. In a temperature regulator, the combination with an electric heater, an electrically operated switch for opening and closing the circuit of the heater and a thermometer comprising a pressure gage, a tubular body communicating therewith and partially filled with liquid, subjected to the temperature to be controlled and adapted to be partially vaporized by said temperature, of a control switch automatically responsive to the variations in pressure of said vapor for actuating said electrically operated switch to open and close the heater circuit.

4. In combination, a heating appliance, means containing a saturated vapor, the pressure of which varies with its temperature, and means automatically responsive to the variations in the pressure of said saturated vapor for controlling the heating appliance.

In witnesss whereof, I have hereunto subscribed my name in the presence of two witnesses.

WILLIAM S. HADAWAY, Jr.

Witnesses:
  FRANK H. HUBBARD,
  A. B. DUNBAR.